United States Patent [19]
Metailler

[11] 3,872,942
[45] Mar. 25, 1975

[54] EARTH-ROLLING VEHICLES
[75] Inventor: Roger Metailler, Grenoble, France
[73] Assignee: Societe Anonyme dite: Richier, Paris, France
[22] Filed: July 31, 1973
[21] Appl. No.: 384,195

[30] Foreign Application Priority Data
Aug. 3, 1972  France .............................. 72.28509

[52] U.S. Cl. ................................. 180/20, 404/122
[51] Int. Cl. ........................................... E01c 19/23
[58] Field of Search ............. 180/20, 74, 51, 24.08; 404/125, 122, 117; 172/349

[56] References Cited
UNITED STATES PATENTS
3,431,832  3/1969  Lang ................................. 404/117
3,565,200  2/1971  Siewert ............................ 180/20 X Primary Examiner—David Schonberg
Assistant Examiner—J. A. Pekar
Attorney, Agent, or Firm—Eyre, Mann & Lucas

[57] ABSTRACT

An earth-rolling vehicle comprises two rollers each mounted in a respective frame. The frames are connected by pivot means. A drive unit comprising a motor coupled to a speed reducing device is connected to drive driving wheels which contact the rollers to thereby drive the rollers and to support the drive unit. The drive unit is connected to the pivot means in a manner as to urge the driving wheels against the rollers and to allow pivoting of the drive means relative to either frame.

2 Claims, 2 Drawing Figures

EARTH-ROLLING VEHICLES

BACKGROUND OF THE INVENTION

1. Field of the Invention

The present invention relates to earth-rolling vehicles.

2. Description of the Prior Art

There have been proposed earth rolling vehicles comprising two rollers each mounted in a respective one of two pivotally connected frames. The rollers are driven by means of friction wheels which are preferably provided with pneumatic tyres and a drive shaft of which is connected to a drive unit. In these previously proposed vehicles it is difficult to effect driving, because of the fact that the movements of the two rollers of the vehicle are independent.

SUMMARY OF THE INVENTION

According to the invention there is provided in an earth-rolling vehicle two rollers, two frames each carrying a respective one of the rollers, pivot means connecting the frames, a drive unit comprising a motor and a speed reducing device coupled to the motor, and driving wheels carried by the drive unit, said driving wheels contacting the rollers whereby to drive the rollers and to support the drive unit, the drive unit being arranged between the two frames in such a manner as to urge the driving wheels against the rollers.

BRIEF DESCRIPTION OF THE DRAWINGS

An earth-rolling vehicle embodying the invention will now be described by way of example only, with reference to the accompanying diagrammatic drawings in which.

DESCRIPTION OF THE PREFERRED EMBODIMENT

Figure 1:
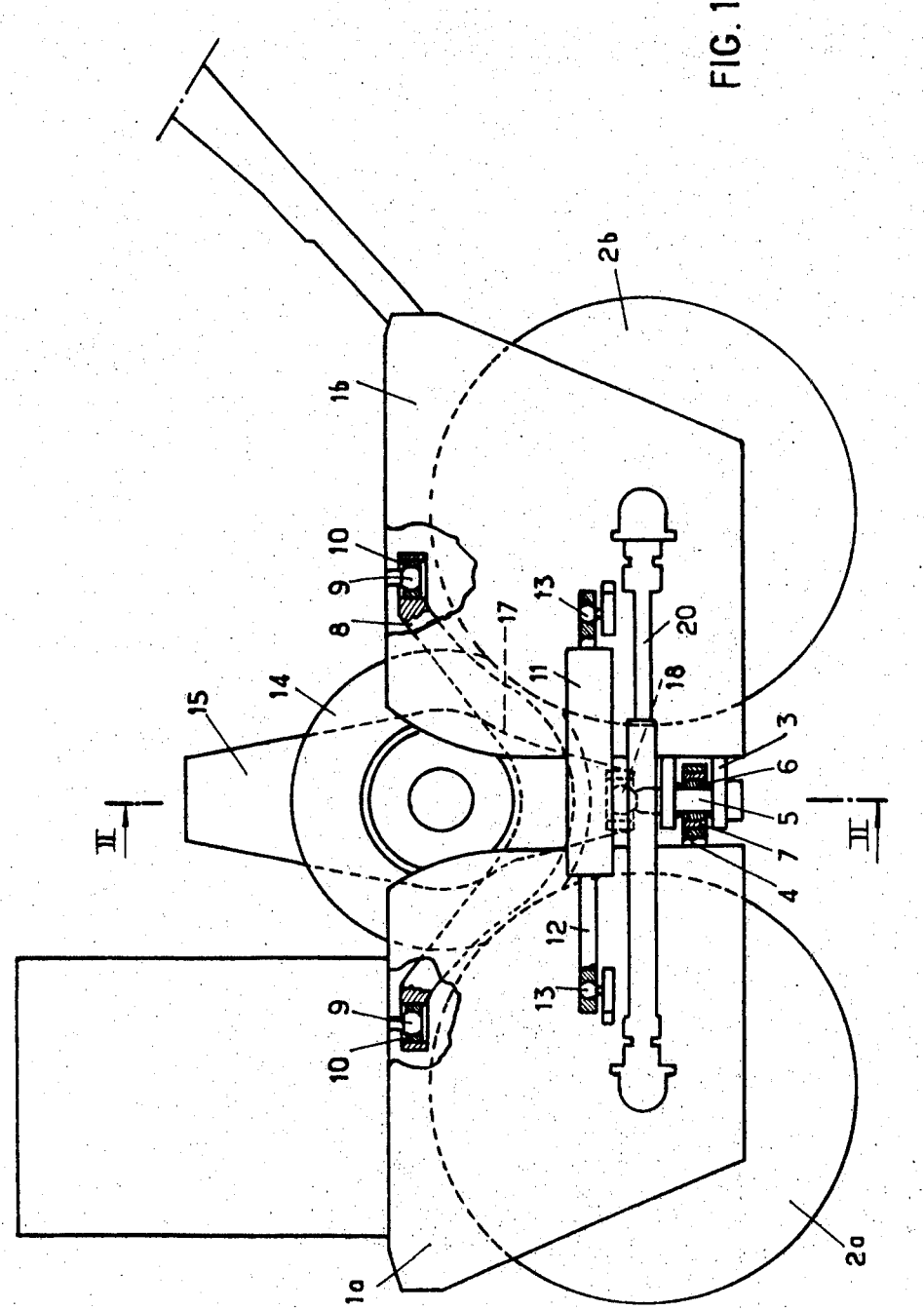
FIG. 1 is an elevation of the earth-rolling vehicle.
Figure 2:
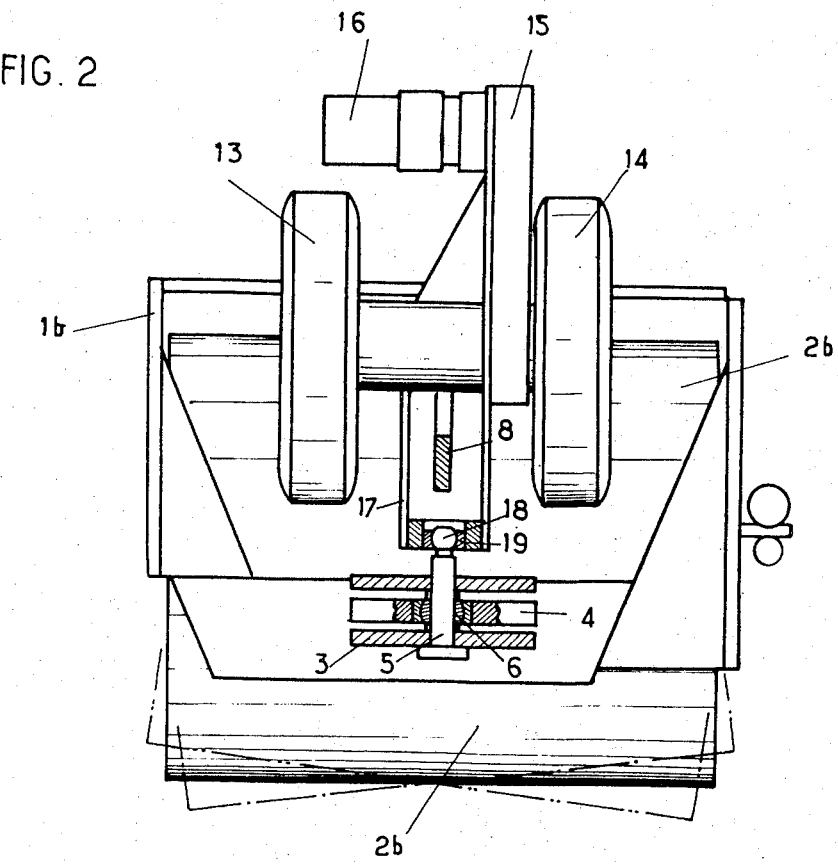
FIG. 2 is a section taken on line II — II of FIG. 1.

As shown in the drawings, the earth-rolling vehicle comprises two frames 1a and 1b having respective rollers 2a and 2b rotatably mounted therein. The coupling between the frames and the rollers can be either rigid or flexible.

The two frames 1a and 1b are connected to one another by a ball joint arrangement comprising a yoke 3 rigid with the frame 1b, a tenon 4 rigid with the frame 1a, and a shaft 5 which extends through the yoke 3 and a ball 6 of a ball joint, a cage of the ball joint being fixed to the tenon 4. The upper parts of the two frames are also connected to one another by a curved bar 8 whose ends are coupled to the frames through ball joints disposed in the central longitudinal plane of the frames. Balls 9 of these latter ball joints are rigidly fixed to the corresponding frames and cooperate with cages 10 carried by the bar 8. The two frames are further connected to one another by steering means which comprises a hydraulic jack the two elements 11 and 12 of which are coupled to the frames by ball joints 13.

Two wheels 14 are provided for driving the rollers. The wheels 14 have pneumatic tyres and are keyed to an output shaft of a speed-reducing device 15 driven by a motor 16. The speed-reducing device 15 is mounted on a support 17 connected to the shaft 5 by a ball joint comprising a ball 18 rigid with the shaft 5 and cooperating with a cage 19 rigid with the support 17. This ball joint is positioned such that the tyres of the wheels 14 press against the roller 2a and 2b with sufficient force to ensure good traction between the rollers and the wheels, the axis of the ball joint being co-axial with the axis of the shaft 5.

A transmission 20 interconnects out-of-balance weight shafts mounted in the rollers 2a and 2b so as to vibrate the rollers.

From the preceding description it can be seen that the drive unit comprising the motor 16 and the speed-reducing device 15 is mounted as to "float" on the rollers and thus the drive unit follows the relative movements of the two rollers 2a and 2b. The tyres of the wheels 14 continue to bear against the rollers 2a and 2b even when the earth-roller is being steered. The force which the tyres of the wheels 14 exert on the shaft 5 ensures that any play in the ball joint 7,6 interconnecting the two frames 1a and 1b will be taken up automatically.

The system of interconnection between the two frames 1a and 1b is strong and takes up little space, and avoids high stresses at the points of support of the connections.

Although as particularly described, the frames are pivotally connected by a ball joint arrangement, the frames can alternatively be connected by a universal joint or by other suitable pivot means.

The arrangement described permits the driving wheels to contact the rollers at all times.

I claim:

1. In an earth-rolling vehicle comprising two tandem rollers and two frames each carrying a respective one of the rollers
   a. pivot means connecting the frames, said pivot means comprising a first ball joint, said ball joint comprising a ball and a cage, the cage being mounted on one of the frames, the ball being mounted on a shaft, said shaft being carried by the other frame;
   b. a drive unit comprising a motor and a speed reducing device coupled to the motor, driving wheels carried by the drive unit, said driving wheels contacting both of the rollers whereby to drive the rollers and to support the drive unit, the drive unit being arranged between the two frames in such a manner as to urge the driving wheels against the rollers; and
   c. a second ball joint connecting the drive unit to the shaft on which the ball of the first ball joint is mounted.

2. In an earth-rolling vehicle
   two rollers,
   two frames each carrying a respective one of the rollers,
   pivot means connecting the frames said pivot means comprising:
      a shaft, and
      a first ball joint positioned in the central longitudinal median plane of the vehicle, said ball joint comprising:
         a ball, and
         a cage, the cage being mounted on one of the frames, the ball being mounted on the shaft, and the shaft being carried by the other frame; a drive unit comprising,
      a motor, and
      a speed-reducing device coupled to the motor, driving wheels carried by the drive unit, said driving wheels contacting the rollers whereby to drive the rollers and to support the drive unit, the drive unit being arranged between the two frames in such a manner as to urge the driving wheels against the rollers and a bar arranged substantially in the central longitudinal median plane of the vehicle, and ball joints, said ball joints connecting the bar to the two frames.

* * * * *